(12) United States Patent
Burger et al.

(10) Patent No.: US 8,180,997 B2
(45) Date of Patent: May 15, 2012

(54) DYNAMICALLY COMPOSING PROCESSOR CORES TO FORM LOGICAL PROCESSORS

(75) Inventors: Douglas C. Burger, Austin, TX (US);
Stephen W. Keckler, Austin, TX (US);
Robert McDonald, Austin, TX (US);
Paul Gratz, Austin, TX (US); Nitya Ranganathan, Austin, TX (US);
Lakshminarasimhan Sethumadhavan, Austin, TX (US); Karthikevan Sankaralingam, Austin, TX (US);
Ramadass Nagarajan, Austin, TX (US);
Changkyu Kim, Austin, TX (US);
Haiming Liu, Austin, TX (US)

(73) Assignee: Board of Regents, University of Texas System, Austin, TX (US)

( * ) Notice: Subject to any disclaimer, the term of this patent is extended or adjusted under 35 U.S.C. 154(b) by 530 days.

(21) Appl. No.: 12/166,439

(22) Filed: Jul. 2, 2008

(65) Prior Publication Data
US 2009/0013160 A1 Jan. 8, 2009

Related U.S. Application Data

(60) Provisional application No. 60/948,120, filed on Jul. 5, 2007.

(51) Int. Cl.
*G06F 15/76* (2006.01)
(52) U.S. Cl. .......................................... 712/15; 718/104
(58) Field of Classification Search .......................... None
See application file for complete search history.

(56) References Cited

U.S. PATENT DOCUMENTS

| | | | |
|---|---|---|---|
| 6,275,919 B1 | 8/2001 | Johnson | |
| 6,301,673 B1 | 10/2001 | Foster et al. | |
| 6,453,344 B1 * | 9/2002 | Ellsworth et al. | 709/220 |
| 6,877,059 B2 | 4/2005 | Solomon et al. | |
| 6,934,254 B2 | 8/2005 | Brown et al. | 370/232 |
| 6,957,435 B2 * | 10/2005 | Armstrong et al. | 718/104 |
| 6,993,640 B2 * | 1/2006 | Doing et al. | 712/200 |
| 6,996,698 B2 * | 2/2006 | Slegel et al. | 711/220 |

(Continued)

FOREIGN PATENT DOCUMENTS
WO 2009006607 1/2009

OTHER PUBLICATIONS

Coons, K. et al., "Feature Selection for Instruction Placement in an EDGE Architecture," Mar. 17, 2007, 6 pages.

(Continued)

*Primary Examiner* — Idriss N Alrobaye
(74) *Attorney, Agent, or Firm* — Schwabe, Williamson & Wyatt, P.C.

(57) ABSTRACT

A method, system and computer program product for dynamically composing processor cores to form logical processors. Processor cores are composable in that the processor cores are dynamically allocated to form a logical processor to handle a change in the operating status. Once a change in the operating status is detected, a mechanism may be triggered to recompose one or more processor cores into a logical processor to handle the change in the operating status. An analysis may be performed as to how one or more processor cores should be recomposed to handle the change in the operating status. After the analysis, the one or more processor cores are recomposed into the logical processor to handle the change in the operating status. By dynamically allocating the processor cores to handle the change in the operating status, performance and power efficiency is improved.

21 Claims, 9 Drawing Sheets

U.S. PATENT DOCUMENTS

| | | | |
|---|---|---|---|
| 7,036,036 B2 | 4/2006 | Vorbach et al. | |
| 7,051,188 B1* | 5/2006 | Kubala et al. | 712/29 |
| 7,284,100 B2* | 10/2007 | Slegel et al. | 711/156 |
| 7,392,524 B2* | 6/2008 | Ault et al. | 718/1 |
| 7,526,637 B2* | 4/2009 | Jung et al. | 712/241 |
| 7,587,578 B2* | 9/2009 | Isobe | 712/37 |
| 7,664,940 B2* | 2/2010 | Conklin et al. | 712/220 |
| 7,802,073 B1* | 9/2010 | Cheng et al. | 712/10 |
| 2003/0012225 A1* | 1/2003 | Banerjee et al. | 370/475 |
| 2003/0065835 A1* | 4/2003 | Maergner et al. | 710/61 |
| 2006/0020769 A1* | 1/2006 | Herrell et al. | 712/13 |
| 2006/0020944 A1* | 1/2006 | King et al. | 718/104 |
| 2006/0031702 A1* | 2/2006 | Jardine et al. | 713/503 |
| 2006/0075207 A1* | 4/2006 | Togawa et al. | 711/202 |
| 2006/0282624 A1* | 12/2006 | Yokota | 711/147 |
| 2007/0074011 A1* | 3/2007 | Borkar et al. | 712/227 |
| 2007/0239965 A1* | 10/2007 | Lewites et al. | 712/13 |
| 2008/0046621 A1* | 2/2008 | Okino et al. | 710/260 |
| 2009/0013153 A1* | 1/2009 | Hilton | 712/29 |

OTHER PUBLICATIONS

International Search Report, issued in International Patent Application No. PCT/US2008/069226, mailed Oct. 9, 2008, 1 page.

Written Opinion, issued in International Patent Application No. PCT/US2008/069226, mailed Oct. 9, 2008, 7 pages.

International Preliminary Report on Patentability, issued in International Patent Application No. PCT/US2008/069226, mailed Jan. 5, 2010, 8 pages.

Engin ipek, et al., "Core Fusion: Accommodating Software Diversity in Chip Multiprocessors," ISCA '07 (Jun. 2007).

Doug Burger, et al., "Scaling to the End of Silicon with EDGE Architectures," Computer, vol. 37, No. 7, pp. 44-55 (Jul. 2004).

* cited by examiner

DYNAMICALLY COMPOSING PROCESSOR CORES TO FORM LOGICAL PROCESSORS

CROSS-REFERENCE TO RELATED APPLICATIONS

This application is related to the following commonly owned co-pending U.S. Patent Application:

Provisional Application Ser. No. 60/948,120, "Method and Apparatus for Providing Dynamic Composition of Multiple Processors for Adaptive Single-Threaded Executions," filed Jul. 5, 2007, and claims the benefit of its earlier filing date under 35 U.S.C. §119(e).

STATEMENT REGARDING GOVERNMENT SPONSORED RESEARCH OR DEVELOPMENT

This invention was made with government support under F30602-03-C-4106 awarded by The Air Force Research Lab. The government has certain rights in the invention.

TECHNICAL FIELD

The present invention relates to multiprocessor systems, and more particularly to dynamically allocating processor cores to handle changes in operating statuses to improve performance and power efficiency.

BACKGROUND OF THE INVENTION

Due to the limitations on clock frequency scaling, the performance gains in future computer systems will come from power-efficient exploitation of concurrency. Consequently, the computer industry has migrated towards including multiple processors on a single chip, which are known as chip multiprocessors ("CMPs").

In a CMP, multiple copies of identical stand-alone central processing units (CPUs) are placed on a single chip, and a fast, fine-grained communication mechanism may be used to combine CPUs to match the intrinsic parallelism of the application. That is, in CMPs built using the copy-exact approach, all CPUs on a CMP are identical, having exact copies of arithmetic logic units (ALUs), caches and pipelines. This approach minimizes the design complexity of CMPs, since only one CPU needs to be designed, but is instantiated multiple times.

However, the granularity (i.e., the issue width) and the number of processors on the chip in a CMP are fixed at design time based on the designers' best analyses about the desired workload mix and operating points. The issue width may refer to the maximum number of instructions that can be issued in a given cycle for a given processor. By having such limitations, the CMP cannot efficiently handle changes in operating conditions, such as changes in the number and type of available threads or changes in the streams of instructions which occur over time. For example, not all of the processors in the CMP will be effectively utilized if there are not enough software threads at a given time or if there are not enough complex computations to be made in those software threads at a given time. As a result, such a design is power inefficient.

If, however, the appropriate amount of processing power could be dynamically allocated to handle changes in operating conditions, then performance and power efficiency could greatly be improved.

BRIEF SUMMARY OF THE INVENTION

In one embodiment of the present invention, a method for dynamically composing processor cores to form logical processors comprises receiving a change in an operating status. The method further comprises triggering a mechanism to recompose one or more processor cores into a logical processor to handle the change in the operating status. Additionally, the method comprises performing an analysis as to how one or more processor cores should be recomposed to handle the change in the operating status. Furthermore, the method comprises recomposing the one or more processor cores into the logical processor to handle the change in the operating status.

In another embodiment of the present invention, a system comprises a memory unit for storing a computer program for dynamically composing processor cores to form logical processors. The system further comprises composable processor cores coupled to the memory unit, where the processor cores of the composable processor cores are dynamically allocated to one or more logical processors to handle changes in an operating status.

In another embodiment of the present invention, an integrated circuit comprises composable processor cores, where the processor cores of the composable processor cores are dynamically allocated to one or more logical processors to handle changes in an operating status.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWING

A better understanding of the present invention can be obtained when the following detailed description is considered in conjunction with the following drawings, in which.

DETAILED DESCRIPTION OF THE INVENTION

The present invention comprises a method, system, computer program product and integrated circuit for dynamically composing processor cores to form logical processors. In one embodiment of the present invention, processor cores are composable in that one or more processor cores are dynamically allocated to form a logical processor to handle a change in the operating status. Once a change in the operating status is detected, a mechanism may be triggered to recompose one or more processor cores into a logical processor to handle the change in the operating status. An analysis may be performed as to how one or more processor cores should be recomposed to handle the change in the operating status. After the analysis, the one or more processor cores are recomposed into the logical processor to handle the change in the operating status. By being able to dynamically allocate the processor cores to handle the change in the operation status in question, performance and power efficiency can be greatly improved.

The principles of the present invention described herein may be applied to any computer architecture related to programming, such as the Explicit Data Graph Execution ("EDGE") instruction set architecture. Details regarding the EDGE instruction set architecture are described in "Scaling to the End of Silicon with EDGE Architectures," Computer, Vol. 37, No. 7, pp. 44-55, July, 2004, which is incorporated herein in its entirety. The principles of the present invention are not to be limited in scope to any particular computer architecture.

Further, while the following discusses the present invention in connection with dynamic aggregation, the principles of the present invention may be applied to static aggregation (i.e., the compiler determines how many processor cores to be used). A person of ordinary skill in the art would be capable of applying the principles of the present invention to such an implementation. Further, embodiments applying the principles of the present invention to such an implementation would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
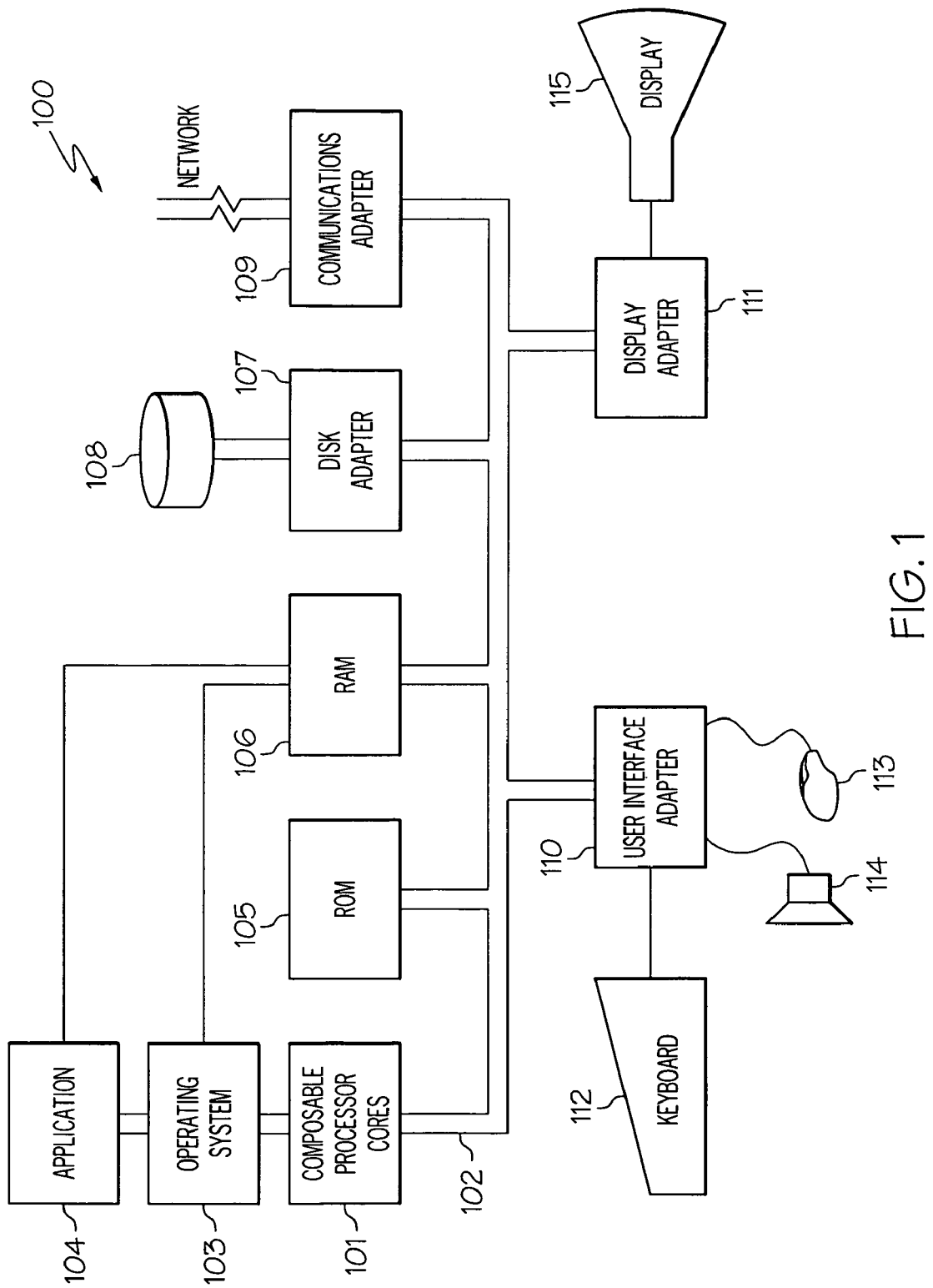
FIG. 1 is a hardware configuration of a computer system in accordance with an embodiment of the present invention.

FIG. 1—Hardware Configuration of Computer System

FIG. 1 illustrates an embodiment of a hardware configuration of computer system 100 which is representative of a hardware environment for practicing the present invention. Computer system 100 may have composable processor cores 101 coupled to various other components by system bus 102. A more detailed description of composable processor cores 101 is provided below in connection with FIGS. 2A-C. Referring to FIG. 1, an operating system 103 may run on composable processor cores 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, a program for dynamically allocating processor cores to handle changes in the operating status to improve performance and power efficiency as discussed further below in association with FIGS. 5A-C. In one embodiment, application 104 may be executed by a particular processor core of composable processor cores 101. In another embodiment, application 104 may be executed by a processor (not shown) separate from composable processor cores 101 where that processor may be an additional processor coupled to bus 102 and application 104.

Referring to FIG. 1, read-only memory ("ROM") 105 may be coupled to system bus 102 and include a basic input/output system ("BIOS") that controls certain basic functions of computer device 100. Random access memory ("RAM") 106 and disk adapter 107 may also be coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for dynamically allocating processor cores to handle changes in the operating status to improve performance and power efficiency, as discussed further below in association with FIGS. 5A-C, may reside in disk unit 108 or in application 104.

Referring to FIG. 1, computer system 100 may further include a communications adapter 109 coupled to bus 102. Communications adapter 109 may interconnect bus 102 with an outside network (not shown) thereby allowing computer system 100 to communicate with other similar devices.

I/O devices may also be connected to computer system 100 via a user interface adapter 110 and a display adapter 111. Keyboard 112, mouse 113 and speaker 114 may all be interconnected to bus 102 through user interface adapter 110. Data may be inputted to computer system 100 through any of these devices. A display monitor 115 may be connected to system bus 102 by display adapter 111. In this manner, a user is capable of inputting to computer system 100 through keyboard 112 or mouse 113 and receiving output from computer system 100 via display 115 or speaker 114.

It is noted that the principles of the present invention are not to be limited in scope to being implemented in a general purpose computing system but may be implemented in any type of computing system, such as an embedded computing system where the power/performance tradeoff may be even more pronounced.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, and optical data storage devices. The computer readable medium can also be distributed over network-coupled computer systems so that the computer readable code is stored and executed in a distributed fashion.

As discussed in the Background section, the granularity (i.e., the issue width) and the number of processors on the chip in a CMP are fixed at design time based on the designers' best analyses about the desired workload mix and operating points. The issue width may refer to the maximum number of instructions that can be issued in a given cycle for a given processor. By having such limitations, the CMP cannot efficiently handle the changes in the operating status, such as changes in the number and type of available threads or changes in the streams of instructions which occur over time. For example, not all of the processors in the CMP will be effectively utilized if there are not enough software threads at a given time or if there are not enough complex computations to be made in those software threads at a given time. As a result, such a design is power inefficient. If, however, the appropriate amount of processing power could be dynamically allocated to handle the change in the operating status, then performance and power efficiency could greatly be improved.

Figure 2A:
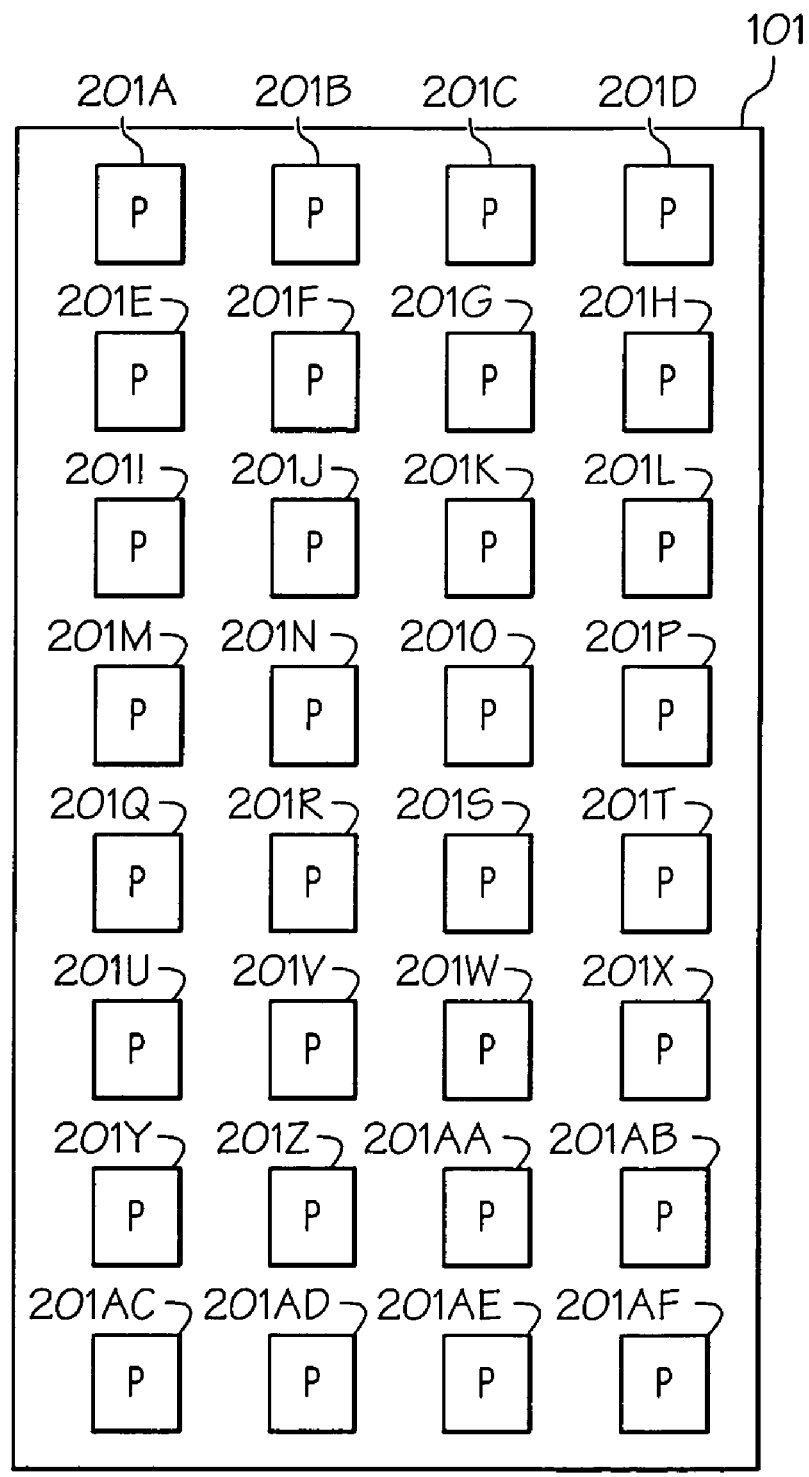
FIGS. 2A-C illustrate the various allocations of processor cores into one or more logical processors to handle changes in an operating status in accordance with an embodiment of the present invention.
Figure 2B:
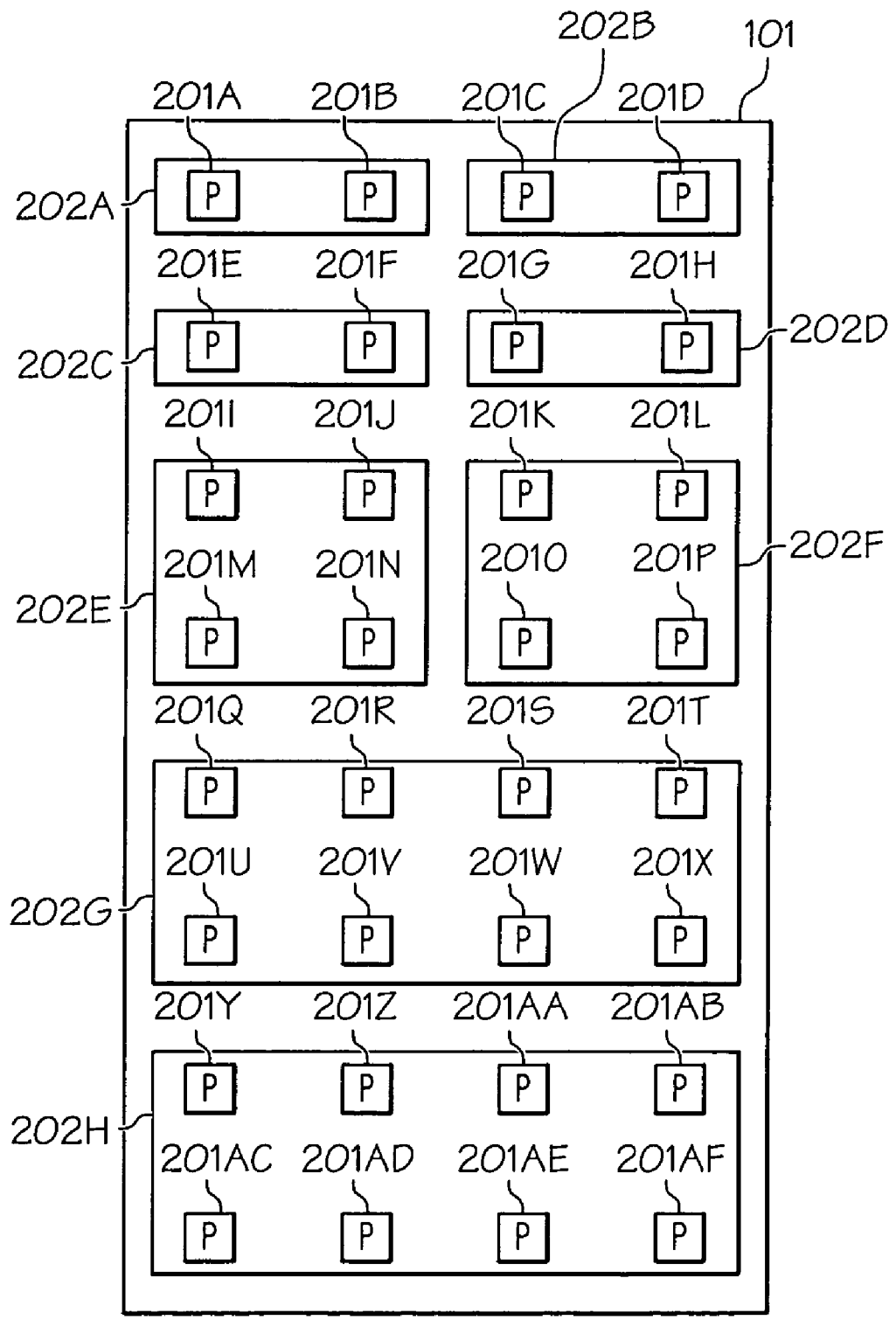
Figure 2C:
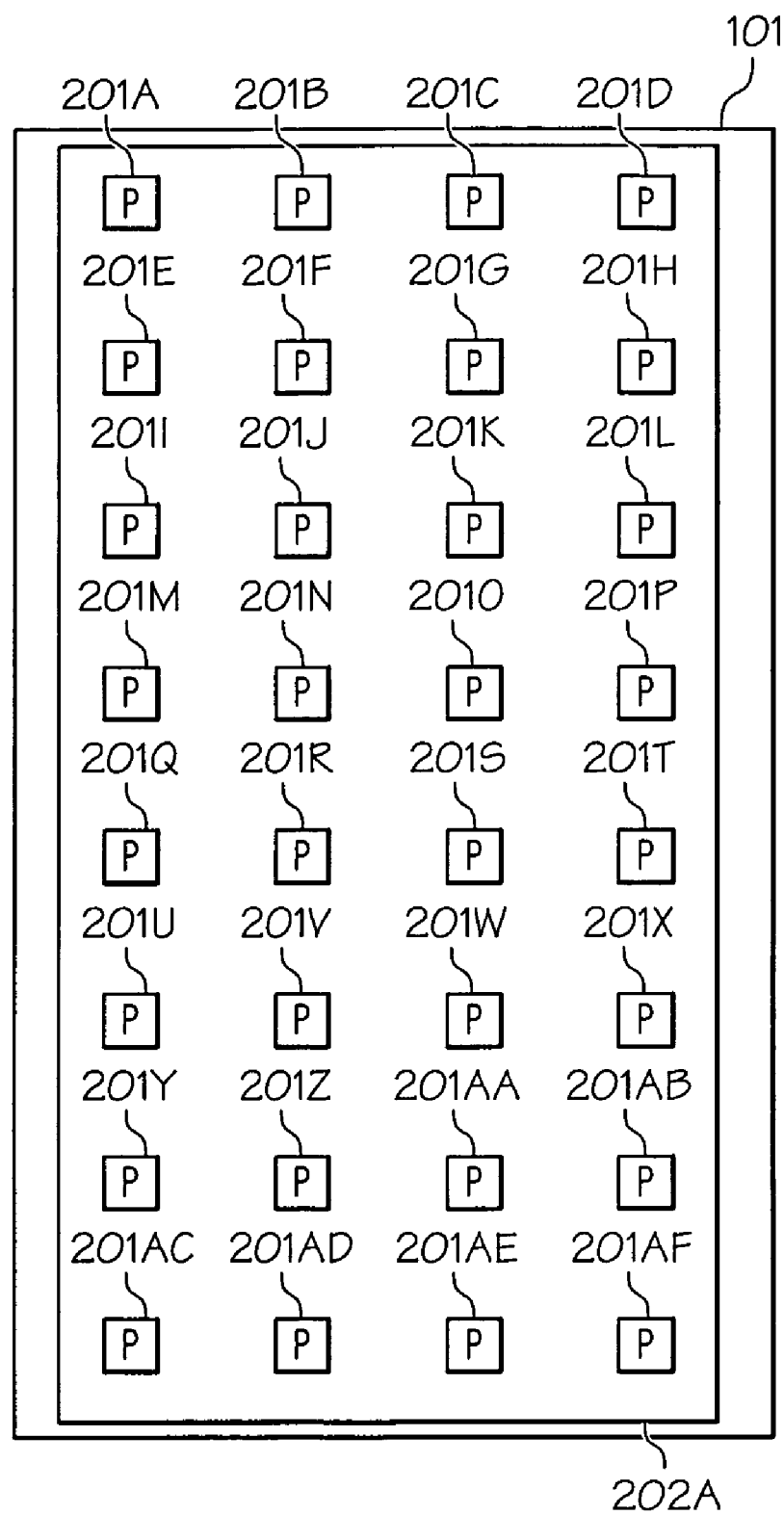
Figure 3:
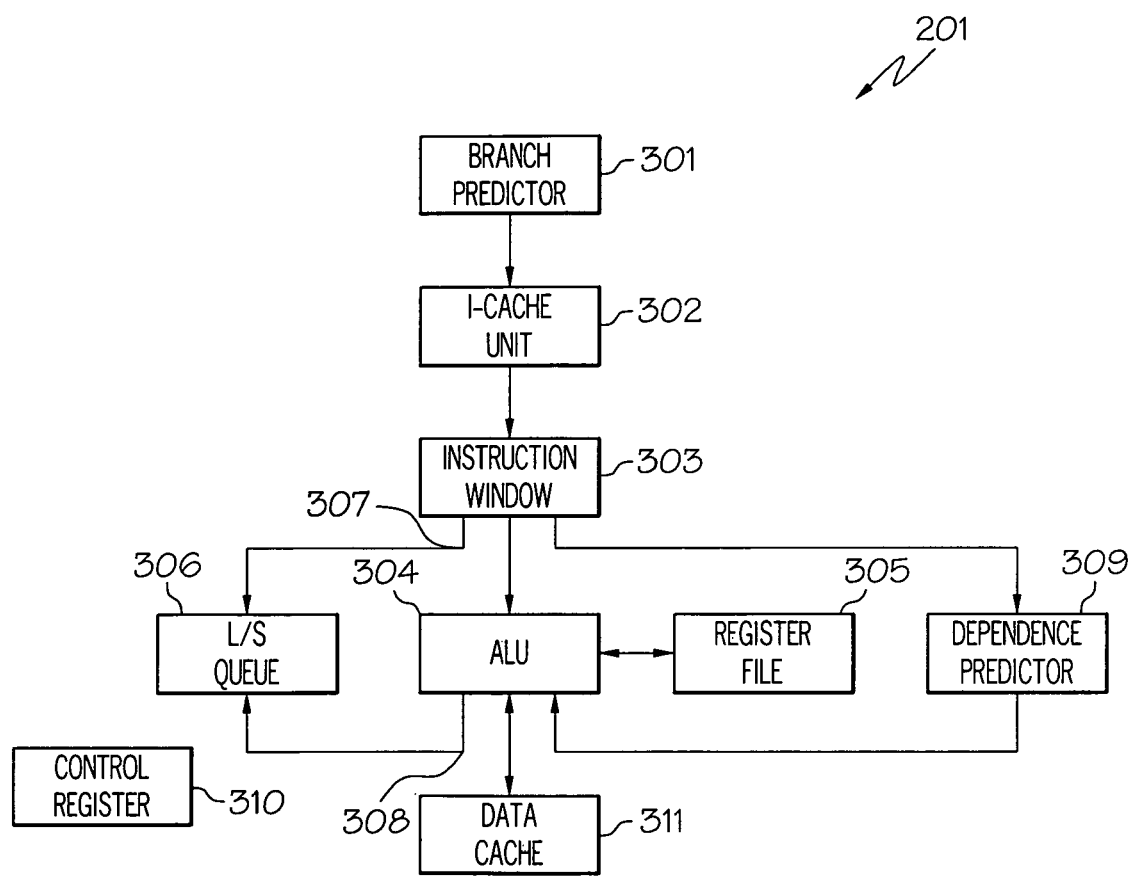
FIG. 3 illustrates the hardware configuration of a processor core in accordance with an embodiment of the present invention.
Figure 4:
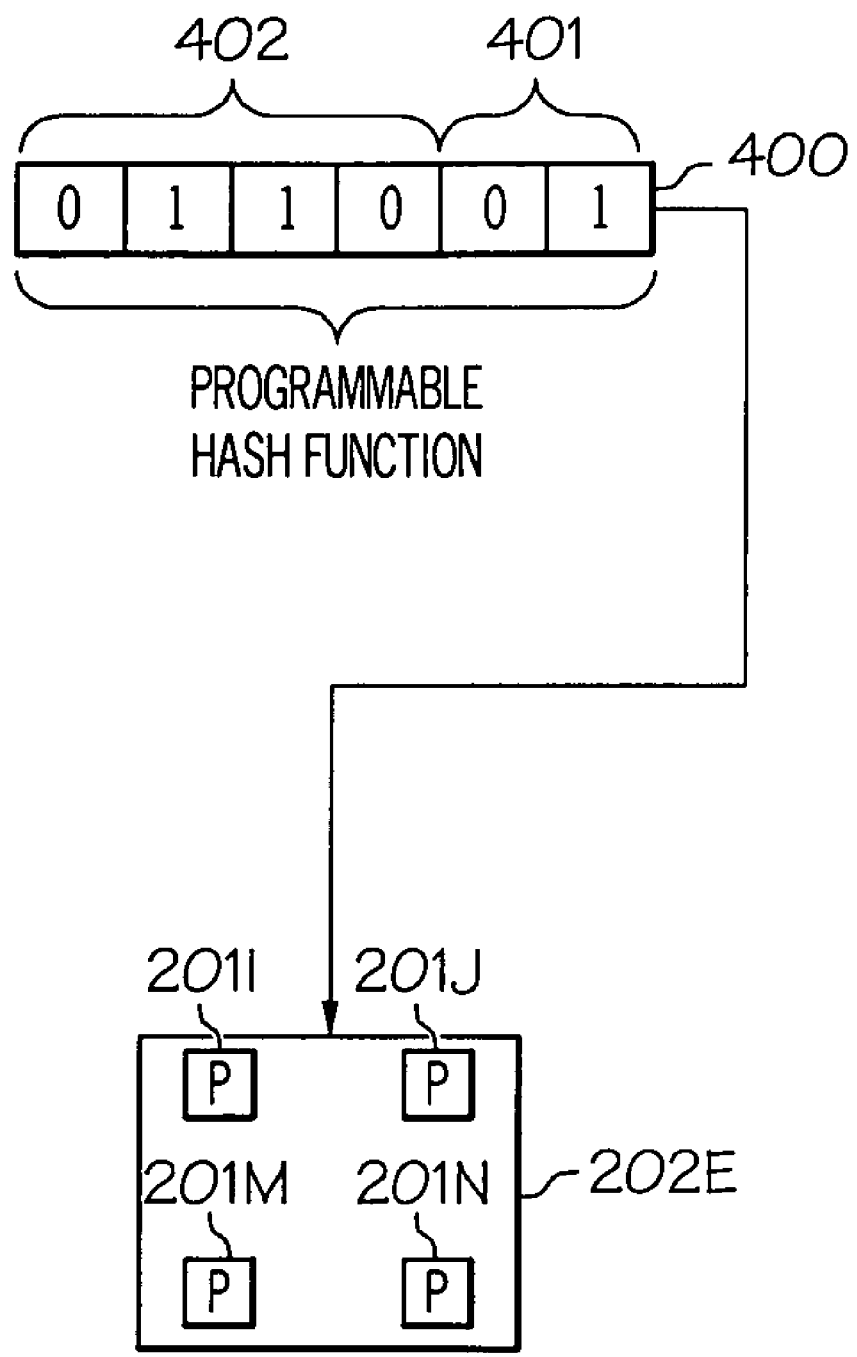
FIG. 4 illustrates the use of a programmable hash function to identify which processor core of a logical processor to perform a particular function to handle changes in an operating status in accordance with an embodiment of the present invention.
Figure 5A:
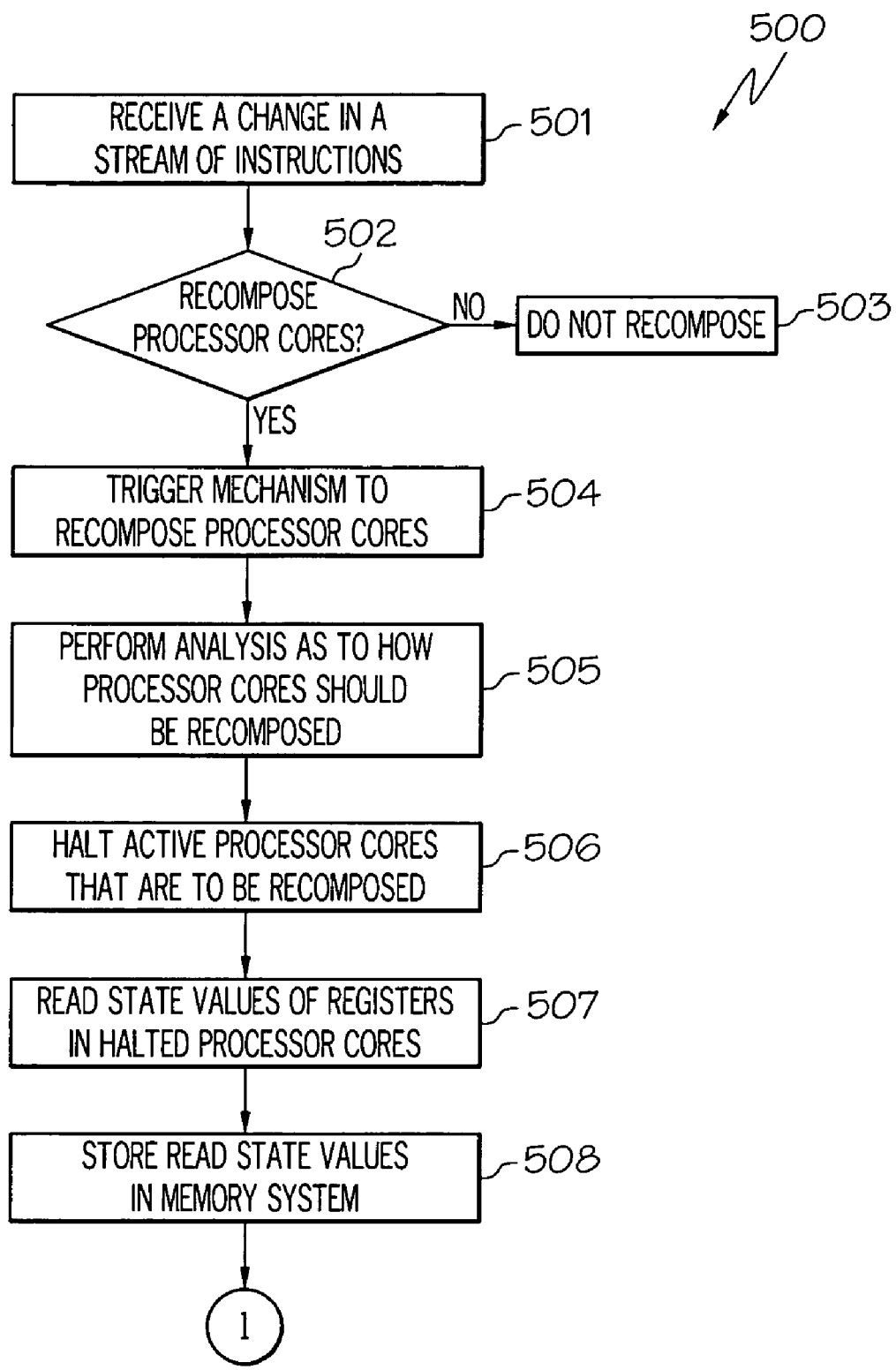
FIGS. 5A-C are a flowchart of a method for dynamically allocating the processor cores to handle changes in an operating status in accordance with an embodiment of the present invention.
Figure 5B:
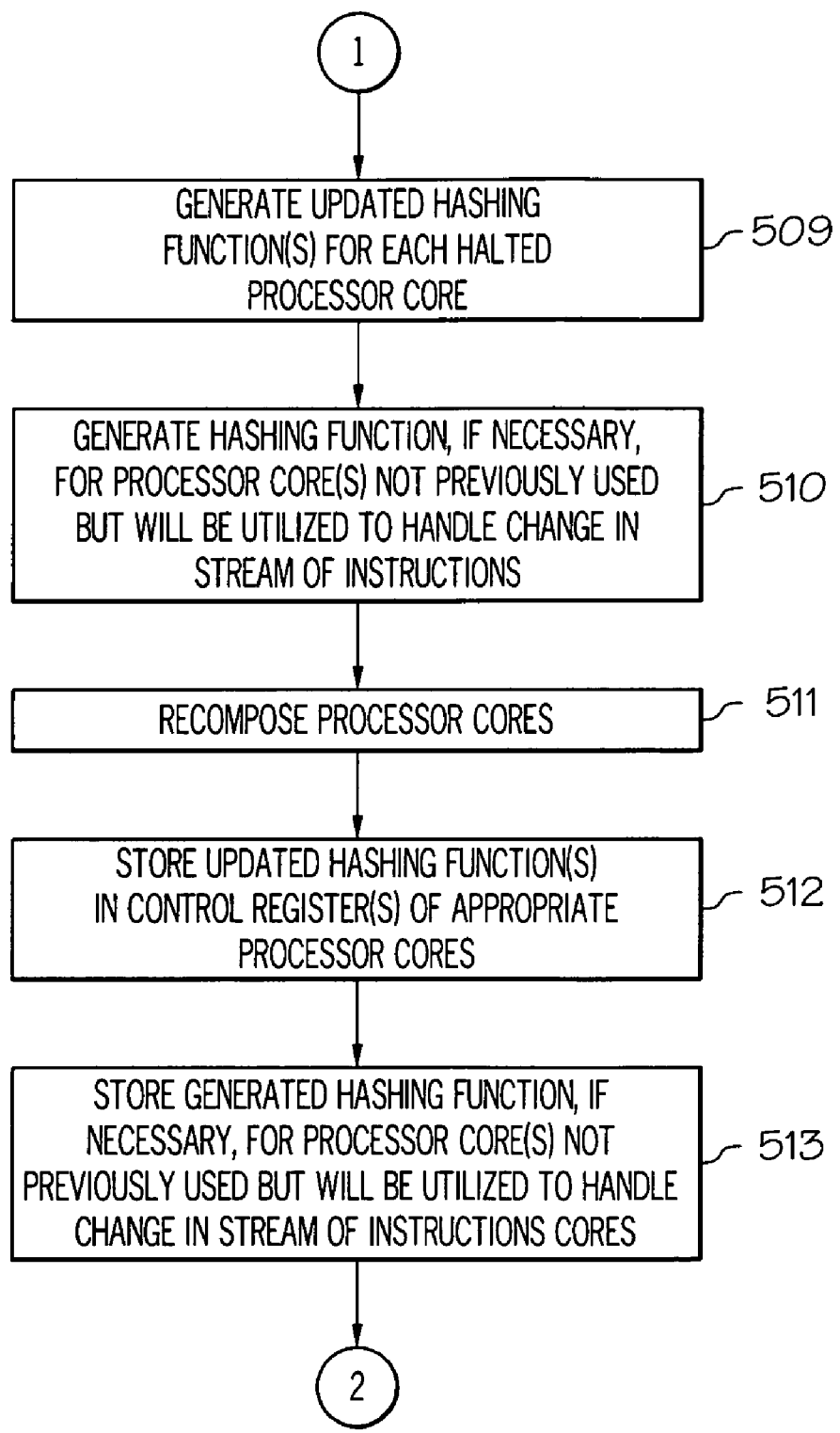
Figure 5C:
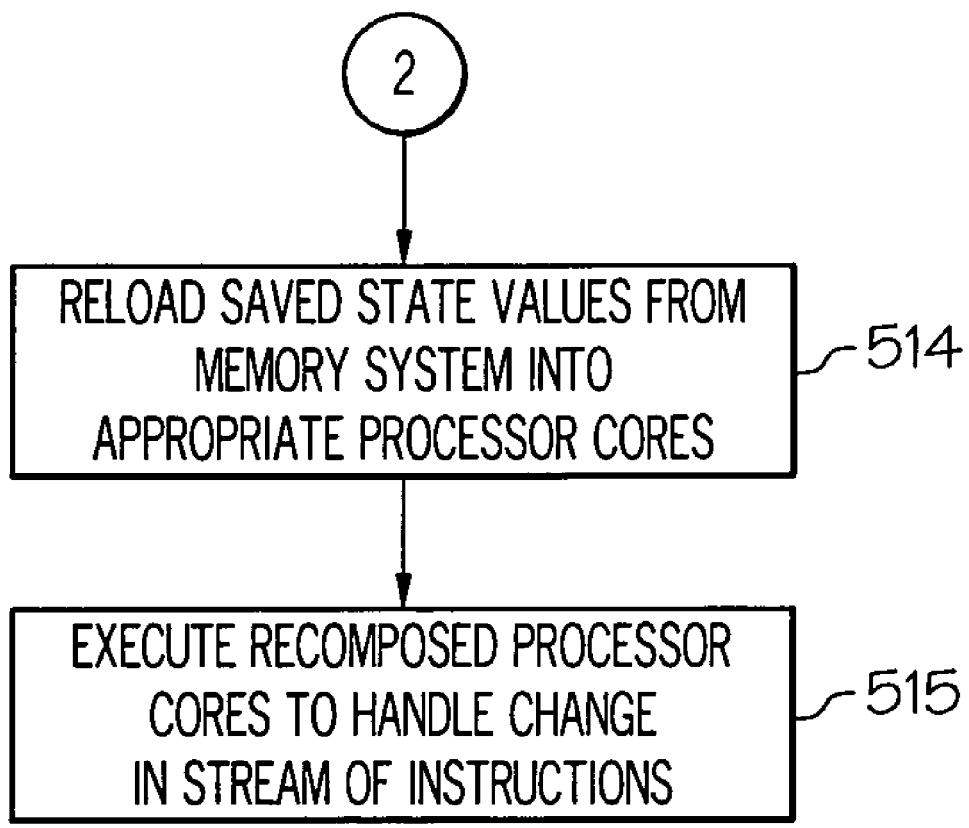

The principles of the present invention dynamically allocate processing power to handle the change in the operating status by using "composable" processor cores as discussed below in connection with FIGS. 2A-C, 3-4 and 5A-C. "Composable" processor cores are cores that can be dynamically allocated into one or more logical processors to handle the change in the operating status. FIGS. 2A-C illustrate the various allocations of the processor cores into one or more logical processors to handle the change in the operating status. FIG. 3 illustrates the hardware configuration of a processor core. FIG. 4 illustrates the use of a programmable hash function to identify which processor core of the logical processor is to perform a particular function to handle the change in the operating status. FIGS. 5A-C are a flowchart of a method for dynamically allocating processor cores to handle the change in the operating status to improve performance and power efficiency.

FIGS. 2A-C—Composable Processor Cores

FIGS. 2A-C illustrate the various allocations of the processor cores (in composable processor cores 101 (FIG. 1)) into one or more logical processors to handle the change in operating status in accordance with an embodiment of the present invention. In one embodiment, composable processor cores 101 may reside on an integrated circuit. Referring to FIG. 2A, composable processor cores 101 includes processor cores 201A-Z, AA-AF. Processor cores 201A-Z, AA-AF may collectively or individually be referred to as processor cores 201 or processor core 201, respectively. Composable processor cores 101 may include any number of processor cores 201 and composable processor cores 101 are not to be limited in scope to the embodiments disclosed in FIGS. 2A-C. While FIGS. 2A-C illustrate processor cores 201 being physically contiguous, processor cores 201 may be physically non-contiguous. In such an embodiment, each participating processor core 201 would have a unique address in the non-contiguous composition. As a result, each processor core 201 would have the ability to participate in the non-contiguous composition.

Each processor core 201 of composable processor cores 101 may include identical logic as illustrated in FIG. 3. FIG. 3 illustrates the hardware configuration of processor core 201 in accordance with an embodiment of the present invention.

Referring to FIG. 3, processor 201 may include a branch predictor 301 configured to determine whether a conditional branch in the instruction of a program is likely to be taken or not. Branch predictor 301 may be coupled to instruction cache unit 302 (identified as "I-Cache Unit" in FIG. 3). Instruction cache unit 302 may be configured to store instructions corresponding to the effective address (the address representing an address from the program or compiler) received from a program counter (not shown).

Instructions from instruction cache unit 302 may be outputted to issue queues, or what may be referred to as an "instruction window" 303, after the instructions are decoded, such as by a decode unit (not shown). Instruction window 303 may include queues coupled to one or more arithmetic logic units 304 (identified as "ALU" in FIG. 3). ALU 304 may be configured to perform mathematical and logic operations on source operands, such as adding, subtracting, ANDing, ORing and XORing. ALU 304 may input its source and operand information from a register file 305.

Each processor core 201 may further include a load/store queue 306 configured to store load and store instructions at either the time when the effective addresses are computed, such as at point 307, or when the instructions are issued, such as at point 308.

Further, each processor core 201 may include a dependence predictor 309 configured to decide whether to speculatively execute certain loads and stores out of order, while preventing other loads and stores from executing out-of-order (keeping them in-order).

Additionally, each processor core 201 includes a control register 310 configured to store a hashing function as will be discussed further below in connection with FIG. 4.

Returning to FIG. 2A, each processor core 201 may be used logically as a single processor (a logically used processor is referred to herein as a "logical processor") to process a stream of instruction. For example, in FIG. 2A, processor core 201A is logically used as a single processor as well as processor core 201B and so forth. However, these processor cores 201 may be dynamically allocated, such as in combination, to form a logical processor. That is, these processor cores 201 may dynamically be aggregated into a logical entity that functions as a processor from the viewpoint of the software of computer system 100 (FIG. 1).

For example, referring to FIG. 2B, processor cores 201A-B may be dynamically aggregated into logical processor 202A. Processor cores 201C-D may be dynamically aggregated into logical processor 202B. Similarly, processor cores 201E-F and 201G-H may be dynamically aggregated into logical processors 202C and 202D, respectively. Further, processor cores 201I, 201J, 201M and 201N may be dynamically aggregated into logical processor 202E. Processor cores 201K, 201L, 201O and 201P may be dynamically aggregated into logical processor 202F. Additionally, processor cores 201Q-X may be dynamically aggregated into logical processor 202G. Further, processor cores 201Y-Z and 201AA-AF may be dynamically aggregated into logical processor 202H. Processor cores 202A-H may collectively or individually be referred to as logical processors 202 or logical processor 202, respectively.

Any number of processor cores 201 may be dynamically allocated into any number of logical processors 202, up to the number of processor cores 201. FIG. 2B is used for illustration as to how processor cores 201 can be allocated into logical processors 202 to handle any number of instruction streams. The manner in which these processors 201 are dynamically allocated into logical processors 202 so as to provide the appropriate amount of processing power for each stream of instructions is described further below in connection with FIGS. 5A-C.

Referring to FIG. 2C, in another example, all of the processor cores 201 may be dynamically allocated into a single logical processor 202A. This may occur when all the processing capability of processor cores 201 is needed to process a particular stream of instructions.

It is noted for clarity that processor cores 201 may be recomposed any number of times, including only one time. Further, FIGS. 2A-C and 3 illustrate, in one embodiment, that each processor core 201 does not physically share structures amongst one another. Instead, microarchitectural protocols are distributed to provide the necessary fetch, execution, memory access/disambiguation and commit capabilities. Further, FIGS. 2A-C and 3 illustrate, in one embodiment, that register renaming is not centralized, but instead is distributed. In one embodiment, branch prediction is not centralized. Further, in one embodiment, processor cores 201 support a contiguous window of instructions.

As discussed above, processor cores 201 may be dynamically allocated into any number of logical processors 202. When that occurs though, there is a need to uniquely identify each processor core 201 within logical processor 202 so that the particular task can be assigned to the appropriate processor 201. As discussed above, each processor 201 may include a control register 310 (FIG. 3). Control register 310 may store what is referred to herein as the "programmable hash function" which is illustrated in FIG. 4. FIG. 4 illustrates the use of a programmable hash function 400 to identify which processor core 201 of logical processor 202 is to perform a particular function to handle the changes in operating status in accordance with an embodiment of the present invention.

Referring to FIG. 4, in conjunction with FIGS. 2B and 3, as discussed above, logical processor 202E is comprised of processor cores 201I, 201J, 201M and 201N. The assignment of each processor 201I, 201J, 201M and 201N in logical processor 202E may be accomplished through the use of programmable hash function 400 which is stored in control register 310. Programmable hash function 400 may include one or more bits in bit field 401 used to identify a processor core 201 as well as one or more bits in bit field 402 to identify a register within that processor core 201. Hence, referring to the example of FIG. 4, since there are four processor cores 201 within logical processor 202E, then two bits in bit field 401 (e.g., two lower order bits) of programmable hash function 400 may be used to identify a particular processor core 201. For instance, the bit values of 00 may be used to identify processor core 201I. The bit values of 01 may be used to identify processor core 201J. The bit values of 10 may be used to identify processor core 201M and the bit values of 11 may be used to identify processor core 201N. Each processor core 201 includes a unique hashing function 400. Further, hashing function 400 is programmable (i.e., changeable) after processor cores 201 are recomposed (as will be discussed further below in connection with FIGS. 5A-C) so that processor core 201 is uniquely identified within the newly created logical processor 202.

While the foregoing discussed bit field 402 being used to identify a register, it is noted for clarity that bit field 402 may be used to identify other structures, such as a cache location, branch predictor bank location and so forth. Further, it is noted for clarity that hashing function 400 may include any number of bit fields and that hashing function 400 is not to be limited in scope to hashing function 400 depicted in FIG. 4.

In one embodiment, a register file for a logical processor 202 (e.g., logical processor 202E) is made up of the register banks from each of the processor cores 201 (e.g., processor cores 201I, 201J, 201M, 201N) of logical processor 202. As a result, control register 310 in each processor core 201 of logical processor 202 may include multiple hashing functions 400 where each hashing function 400 may be used for different structures (e.g., banks of a data cache, banks of a register file).

In one embodiment, hashing function 400 may need the following information in order to correctly identify the appropriate processor core 201: (1) origin (coordinates) of the sub-array of processor cores 201 that comprise logical processor 202; (2) size (in x and y coordinates) of logical processor 202; and (3) interleaving pattern of registers, cache lines, etc., across processor cores 201.

A method for dynamically allocating processor cores 201 to handle changes in operating status to improve performance and power efficiency is discussed below in connection with FIGS. 5A-C.

FIGS. 5A-C—Method for Dynamically Allocating Processor Cores to Handle Changes in Operating Status to Improve Performance and Power Efficiency FIGS. 5A-C are a flowchart of a method 500 for dynamically allocating processor cores 201 (FIGS. 2-3) to handle changes in operating status in accordance with an embodiment of the present invention.

Referring to FIG. 5A, in conjunction with FIGS. 2A-C, 3 and 4, in step 501, a change in the operating status is received. For example, a new thread may be received to be processed. In another example, a new stream of instructions is received on a current thread being executed. In another example, there is a power supply change which results in computer system 100 (FIG. 1) entering into a new state which necessarily results in a change in the stream of instructions. A "change in the operating status," as used herein, includes these changes as well as a change in the operating environment, such as temperature changes or changes in the power source. A change in the operating status may also include the program entering a new phase of execution, such as a different portion of the same code with different program requirements. Further, the change in the operating status may include changes in the number of threads to be executed. In another example, the change in the operating status may include the program reaching a parallel section.

In step 502, a determination is made as to whether to recompose processor cores 201. "Recompose," as used herein, refers to reallocating processor cores 201 into logical processors 202 as illustrated in FIGS. 2A-C. Recomposing may be enacted to more effectively and efficiently utilize the processing capability of processor cores 201 to better match the processing requirements for processing the change in the operating status. There are many factors that may be used to determine whether to recompose, such as an event that causes a trigger to enact recomposition. For example, an interrupt may cause a trigger to enact recomposition. In another example, a change in the power supply may result in triggering recomposition. Other factors used to determine whether to recompose include the current utilization rate of processor cores 201. For example, if processor cores 201 are currently being utilized at its maximum utilization rate, then it may not be desirable to perform recomposition. Other factors include maximum throughput rate, maximum power efficiency, thread arrival or termination and so forth. The principles of the present invention are not to be limited in scope to any particular factor or factors being used to determine whether to recompose processor cores 201.

If it is determined that there is no need to recompose processor cores 201, then, in step 503, recomposition does not occur.

If, however, it is determined to recompose, then, in step 504, a mechanism is triggered to recompose processor cores 201 into a logical processor 202 to handle the change in the operating status. Each of the factors discussed in connection with step 502 may be used to trigger the recomposition of processor cores 201.

In step 505, an analysis is performed as to how processor cores 201 should be recomposed to handle the change in the operating status. For example, if a particular processor core 201 is being utilized at its maximum utilization rate, then it may not be desirable to be recomposed. However, if a particular processor core 201 is performing below a particular threshold, then that particular processor core 201 may be recomposed. The analysis may consider many factors as to how processor cores 201 should be recomposed. The principles of the present invention are not to be limited in scope to any particular factor being used to analyze how processor cores 201 should be recomposed to handle the change in the operating status.

In step 506, active processor core(s) 201 ("active" processor cores refers to those processor cores that are currently executing streams of instructions) that are to be recomposed are halted. For example, suppose prior to the change in the operating status, processor cores 201A and 201B were each actively operating as a single logical processor 202. Suppose further that it is determined that processor cores 201A-B are to be recomposed into a single logical processor 202. Then, processor cores 201A-B are halted. In another example, suppose that processor cores 201A-D were operating together as a single logical processor 202. Suppose further that is it determined that processor cores 201A-D are to be recomposed into a larger single logical processor 202, such as one comprising processor cores 201A-F. Then, processor cores 201A-D are halted.

In step 507, the state values of the registers in halted processor cores 201 are read. In step 508, the state values read are stored in a memory system (e.g., memory 106 of FIG. 1). In an alternative embodiment, the state values read are stored in local memory, such as a cache, or a staging buffer.

Referring to FIG. 5B, in conjunction with FIGS. 2A-C, 3 and 4, in step 509, an updated hashing function 400 is generated for each halted processor core 201.

In step 510, a hashing function 400 is generated for each processor core 201 that was not previously used but will be utilized to handle the change in the operating status. For example, suppose that processor core 201C was not previously utilized. It may now be decided that processor core 201C should be used, such as with other processor cores 201, to handle the change in the operating status.

In step 511, the processor cores 201 are recomposed into logical processor 202 to handle the change in the operating status. For example, as illustrated in FIG. 2B, processor cores 201A and 201B are recomposed into logical processor 202A.

In step 512, the updated hashing function(s) 400 (referring to the updated hashing function 400 generated in step 509) are stored in control register(s) 310 in the appropriate processor cores 201. For example, if an updated hashing function 400 were generated for halted processor cores 201A and 201B, then those updated hashing functions 400 would be stored in control registers 310 in processor cores 201A and 201B. Each processor core 201A, 201B would have a unique hashing function 400 with bit field 401 used to uniquely identify them within logical processor 202. For example, processor core 201A may include a 0 in bit field 401 of hashing function 400 to identify itself; whereas, processor core 201B may include a 1 in bit field 401 of hashing function 400 to identify itself. In an alternative embodiment, instead of hashing function 400 being stored in control register(s) 310 in the appropriate processor cores 201, information used to compute hashing function 400 (referring to hashing function 400 generated in step 509) may be stored in control register(s) 310 in the appropriate processor cores 201.

In step 513, the hashing function(s) 400 (referring to hashing function 400 generated in step 510) are stored in control register(s) 310 in the appropriate processor cores 201. For example, suppose that processor core 201C was not previously utilized prior to being recomposed with other processor cores 201. A hashing function 400 may be generated for processor core 201C and stored in its control register 310. In an alternative embodiment, the information used to compute hashing function 400 (referring to hashing function 400 generated in step 510) is stored in control register 310.

Referring to FIG. 5C, in conjunction with FIGS. 2A-C, 3 and 4, in step 514, the saved state values from the memory system (referring to step 508) are reloaded into the appropriate processor cores 201. For example, if processor cores 201A and 201B were halted and had their state values of their registers stored in the memory system, then those stored state values may be reloaded into processor cores 201A and 201B. In an alternative embodiment, the saved state values from local memory, such as a cache or a staging buffer, are reloaded into the appropriate processor cores 201.

In step 515, the recomposed processor cores 201 are executed to handle the change in the operating status. For example, referring to FIG. 2B, suppose that processor cores 201I, 201J, 201M and 201N are recomposed into logical processor 202E. After being recomposed into logical processor 202E, these processor cores 201 are executed to handle the change in the operating status.

Although the method, system, computer program product and integrated circuit are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method, comprising:

receiving a change in an operating status of a multiprocessor system, by a first of a plurality of dynamically reallocatable processor cores of the multiprocessor system, the reallocatable processor cores configured to be dynamically allocated to one or more logical processors, wherein the first reallocatable processor core comprises a control register and a plurality of computing resources, wherein the control register is configured to store a hash function configured to program the control register with a hash value that identifies a subset of the processor cores, including the first processor core allocated to a logical processor;

performing, by the first processor core, an analysis to determine a reallocation of the first processor core to another logical processor responsive to said change in said operating status; and reallocating the first processor core to said other logical processor by the hash function of the first processor core generating and storing a hash value in the control register identifying a subset of the processor cores, including the first processor core, allocated to the other logical processor;

wherein the hash value further identifies a subset of the computing resources of the first processor core allocated.

2. The method as recited 1 further comprising:

operating the logical processor including the one or more reallocated processor cores, after the reallocation.

3. The method as recited in claim 1 further comprising:

halting the first processor core in response to the determination to reallocate the first processor core to the logical processor.

4. The method as recited in claim 3 further comprising:

reading state values of registers of first processor core, after halting the first processor core, and storing the state values read into a memory of the first processor core.

5. The method as recited in claim 4 further comprising:

reloading said state values from said memory back into said registers, when the first processor core is reallocated back to another logical processor, wherein the another logical processor is the logical processor the first processor core was previously allocated to.

6. A multiprocessor system, comprising:

a memory unit; and reallocatable processor cores coupled to said memory unit, wherein the reallocatable processor cores are configured to be dynamically allocated to one or more logical processors, wherein a first of the reallocatable processor cores comprises a control register and a plurality of computing resources, wherein the control register is configured to store a hash function configured to program the control register with a hash value that identifies a subset of the processor cores, including the first processor core, allocated to a logical processor;

wherein the hash value further identifies a subset of the computing resources of the first processor core allocated to the logical processor;

wherein the first processor core further comprises circuitry for receiving a change in an operating status of the system, and for performing an analysis to determine a reallocation of the one or more processor cores to logical processors in response to said change in said operating status;

wherein the hash function of the first processor core is further configured to re-program the control register of the first processor core with another hash value to reallocate the first processor core and a subset of the computing resources of the first processor core to another logical processor, in response to a determination to reallocate the first processor core to the other logical processor.

7. The system as recited in claim 6, wherein said first processor core further comprises:
circuitry for halting the first processor core in response to a determination to reallocate the first processor core to the other logical processor.

8. The system as recited in claim 7, wherein said first processor core further comprises:
circuitry for reading state values of registers of the first processor core, and for storing the state values read into memory of the first processor core, after the first processor core is halted.

9. The system as recited in claim 8, wherein said first processor core further comprises:
circuitry for reloading said state values stored in said memory system back into said registers after said first processor is reallocated back to the logical processor.

10. The system as recited in claim 8, wherein said memory of the first processor core comprises:
one or more of a cache or a staging buffer.

11. The system as recited in claim 7, wherein said first processor core further comprises:
circuitry for generating an updated hashing function for the control register of the first processor core.

12. The system as recited in claim 6, wherein said computing resources of the first processor core comprise an arithmetic logic unit (ALU).

13. The system as recited in claim 6, wherein said logical processor is configured to use an Explicit Data Graph Execution ("EDGE") instruction set architecture.

14. The system as recited in claim 6, wherein said one or more reallocatable processor cores are configured to support both contiguous and non-contiguous formation of logical processors at different times.

15. The system as recited in claim 6, wherein said first reallocatable processor core is configured to support a contiguous window of instructions.

16. A computer-readable storage device having a number of programming instructions stored thereon, configured to enable a first of a plurality of dynamically reallocatable processor cores of a multiprocessor system, in response to execution by the first processor core, to perform a number of operations, comprising:
receiving a change in an operating status of the multiprocessor system;
performing an analysis to determine a reallocation of the first processor core from one logical processor to another logical processor, in response to said change in said operating status, wherein the first processor cores comprises a control register and plurality of computing resources; and
reallocating said first processor core to said logical processor in response to said change in said operating status, by a hash function of the first processor core generating and storing a new hash value in the control register, wherein the hash value includes information identifying a subset of the dynamically reallocatable processor cores, including the first processor core, allocated to the logical processor;
wherein the hash value further includes information identifying a subset of the computing resources of the first processor core allocated.

17. The computer-readable storage device as recited in claim 16, wherein the operations further comprises:
halting the first processor core in response to a determination to reallocate the first processor core to the logical processor.

18. The computer-readable storage device as recited in claim 17 wherein the operations further comprises:
reading state values of registers in said halted first processor core, and storing the state values read into a memory of the first processor core.

19. The computer-readable storage device as recited in claim 18, wherein the operations further comprises:
reloading said state values stored in said memory system back into said control register when the first processor core is reallocated back to another logical processor, wherein the another logical processor is the logical processor the first processor core was previously allocated to.

20. An integrated circuit comprising:
a plurality of processor cores configured to be dynamically allocated to one or more logical processors;
wherein a first of the processor cores comprises:
a control register and a plurality of computing resources; and
means for dynamically allocating the first processor core to a logical processor, including means for generating and storing a hash value into the control register, wherein the hash value includes information identifying a subset of the processor cores, including the first processor core, allocated to the logical processor;
wherein the hash value further includes information identifying a subset of the computing resources of the first processor core allocated to the logical processor;
wherein the first processor core further comprises means for receiving a change in an operating status of the integrated circuit, and means for performing an analysis to determine a reallocation of the one or more processor cores to logical processors in response to said change in said operating status;
wherein said means for generating and storing comprise hash function means for re-programming the control register of the first processor core with another hash value to reallocate the first processor core and a subset of the computing resources of the first processor core to another logical processor, in response to a determination to reallocate the first processor core to the other logical processor.

21. The integrated circuit as recited in claim 20, wherein each of said processor cores contains identical logic.

* * * * *

UNITED STATES PATENT AND TRADEMARK OFFICE
CERTIFICATE OF CORRECTION

| | | |
|---|---|---|
| PATENT NO. | : 8,180,997 B2 | Page 1 of 1 |
| APPLICATION NO. | : 12/166439 | |
| DATED | : May 15, 2012 | |
| INVENTOR(S) | : Burger et al. | |

It is certified that error appears in the above-identified patent and that said Letters Patent is hereby corrected as shown below:

On the Face Page, in Field (75), under "Inventors", in Column 1, Line 7, delete "Karthikevan" and insert -- Karthikeyan --, therefor.

In Column 2, Line 32, delete "DRAWING" and insert -- DRAWINGS --, therefor.

In Column 5, Line 60, delete "305." and insert -- 305. In one embodiment, ALU 304 may be coupled to a data cache 311. --, therefor.

In Column 10, Line 44, in Claim 2, delete "1" and insert -- in claim 1 --, therefor.

In Column 12, Line 23, in Claim 18, delete "17" and insert -- 17, --, therefor.

Signed and Sealed this
Ninth Day of October, 2012

David J. Kappos
*Director of the United States Patent and Trademark Office*